(12) United States Patent
Mori

(10) Patent No.: US 7,393,048 B2
(45) Date of Patent: Jul. 1, 2008

(54) SUNSHADE PANEL APPARATUS

(75) Inventor: Keiji Mori, Kariya (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 0 days.

(21) Appl. No.: 11/605,330

(22) Filed: Nov. 29, 2006

(65) Prior Publication Data

US 2007/0126265 A1 Jun. 7, 2007

(30) Foreign Application Priority Data

Dec. 1, 2005 (JP) ............................. 2005-348411

(51) Int. Cl.
*B60J 7/00* (2006.01)
(52) U.S. Cl. .................................... 296/214
(58) Field of Classification Search ................. 296/214
See application file for complete search history.

(56) References Cited

U.S. PATENT DOCUMENTS 6,196,626 B1 * 3/2001 Ito .............................. 296/214
6,669,279 B2 * 12/2003 Messerschmidt ....... 296/220.01
6,726,275 B2 * 4/2004 Hendricus Schrans ...... 296/214
7,229,125 B2 * 6/2007 Mori et al. .................. 296/214

FOREIGN PATENT DOCUMENTS

JP          2003-48433          2/2003

* cited by examiner

*Primary Examiner*—Dennis H Pedder
(74) *Attorney, Agent, or Firm*—Finnegan, Henderson, Farabow, Garrett & Dunner, LLP

(57) ABSTRACT

A sunshade panel apparatus includes a first sunshade panel, a second sunshade panel and a third sunshade panel a first connecting mechanism connecting the second sunshade panel and the third sunshade panel so that the second sunshade panel and the third sunshade panel are moved integrally or relatively; a guide rail supporting the first, second and third sunshade panels to be slidable within the same plane; and a panel housing portion for storing the first, second and third sunshade panels overlapping one another in parallel and provided with inclined guiding portions to move the first, second and third sunshade panels in parallel in an upward direction of the vehicle, wherein the first connecting mechanism has a supporting portion, an engagement groove, an engagement portion; and a biasing member.

7 Claims, 11 Drawing Sheets

SUNSHADE PANEL APPARATUS

CROSS REFERENCE TO RELATED APPLICATIONS

This application is based on and claims priority under 35 U.S.C. §119 with respect to Japanese Patent Application No. 2005-348411 filed on Dec. 1, 2005, the entire content of which is incorporated herein by reference.

FIELD OF THE INVENTION

The present invention relates to a sunshade panel apparatus. More particularly, the present invention pertains to a sunshade panel apparatus including a plurality of sunshade panels which can be opened and closed.

BACKGROUND

In sunroof apparatuses formed with an opening on the roof of a vehicle, a fixed panel or a movable panel including a transparent glass plate is provided at the opening on the roof. In order to adjust the amount of the sunlight taken through the panel into a vehicle compartment, a known sunshade panel apparatus disclosed in, for example, JP2003-48433A is employed.

With the construction of the sunshade panel apparatus described in JP2003-48433A (i.e., paragraphs [0029], [0031], FIGS. 1 and 4), in a state where the sunshade panel is closed, plural panels, for example two panels, are arranged adjacent to each other within a plane in an extended state, whereas in a state where the sunshade panel is opened, the plurality of panels are arranged to be overlapped parallel to each other.

In order to achieve the arrangement structure as described above, the sunshade panel apparatus described in JP2003-48433A is structured as follows. A connection pin engaging with a tilting start portion of a bent guide trail provided at a first sunshade panel is provided at a second sunshade panel. Movement of the sunshade panel is transmitted to the second sunshade panel via the connection pin and the tilting start portion so that two panels synchronously move along a guide way extending along a straight line. When the second sunshade panel is moved to a predetermined opened position, a guide cam provided at the second sunshade panel is moved into a cross guide way portion utilizing a component of a force applying on the tilting start portion. Then, the second sunshade panel is lifted up and the first sunshade panel is slid under the second sunshade panel so that the sunshade panel overlaps the first sunshade panel, as a result, the first and the second sunshade panels are opened.

According to the construction of the known sunshade panel apparatus described in JP2003-48433A, when the sunshade panel is moved to be in the predetermined position, because of the component of the force applying to the tilting start portion, the guide cam provided at the second sunshade panel can smoothly move into the cross guide way portion. However, the component of the force continuously acts upon the tilting start portion even during when two panels are being slid in an adjacently aligned state within one and the same plane. Accordingly, two panels are respectively pressed strongly against the opposite surfaces of the guide way by the slant component of the force. Thus, the resistance when sliding the sunshade panels becomes large, which brings a drawback that the drive force is required to be increased for sliding the sunshade panels.

A need thus exists for a sunshade panel apparatus, which is capable of stably sliding sunshade panels with a small drive force.

SUMMARY OF THE INVENTION

According to an aspect of the present invention, a sunshade panel apparatus includes a first sunshade panel, a second sunshade panel and a third sunshade panel provided below a panel attached to a roof portion of a vehicle, the first sunshade panel located at the forefront in a forward and backward direction of the vehicle, the third sunshade panel located at the rearmost in the forward and backward direction and the second sunshade panel adjacently located between the first sunshade panel and the third sunshade panel; first connecting mechanism connecting the second sunshade panel and the third sunshade panel so that the second sunshade panel and the third sunshade panel are moved integrally or relatively in a manner that the second and third sunshade panels are moved between closing positions, in which the second and third sunshade panels are arranged adjacent to each other within the same plane, and opening positions, in which the second and third sunshade panels are arranged to overlap each other in parallel; a guide rail supporting the first, second and third sunshade panels to be slidable within the same plane; and a panel housing portion for storing the first, second and third sunshade panels overlapping one another in parallel and provided with inclined guiding portions at both end portions in the forward and backward direction of the vehicle to move the first, second and third sunshade panels in parallel in an upward direction of the vehicle, wherein the first connecting mechanism includes: a supporting portion provided at one of the second and third sunshade panels and supported to be rotatable about a horizontal axis parallel to a width direction of the vehicle; an engagement groove provided at the other one of the second and third sunshade panels; an engagement portion slidably engaged with the engagement groove; and a biasing member for applying a rotational moment about the supporting portion to the engagement portion.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Embodiments of the present invention will be explained with reference to illustrations of drawing figures as follows.

Figure 1:
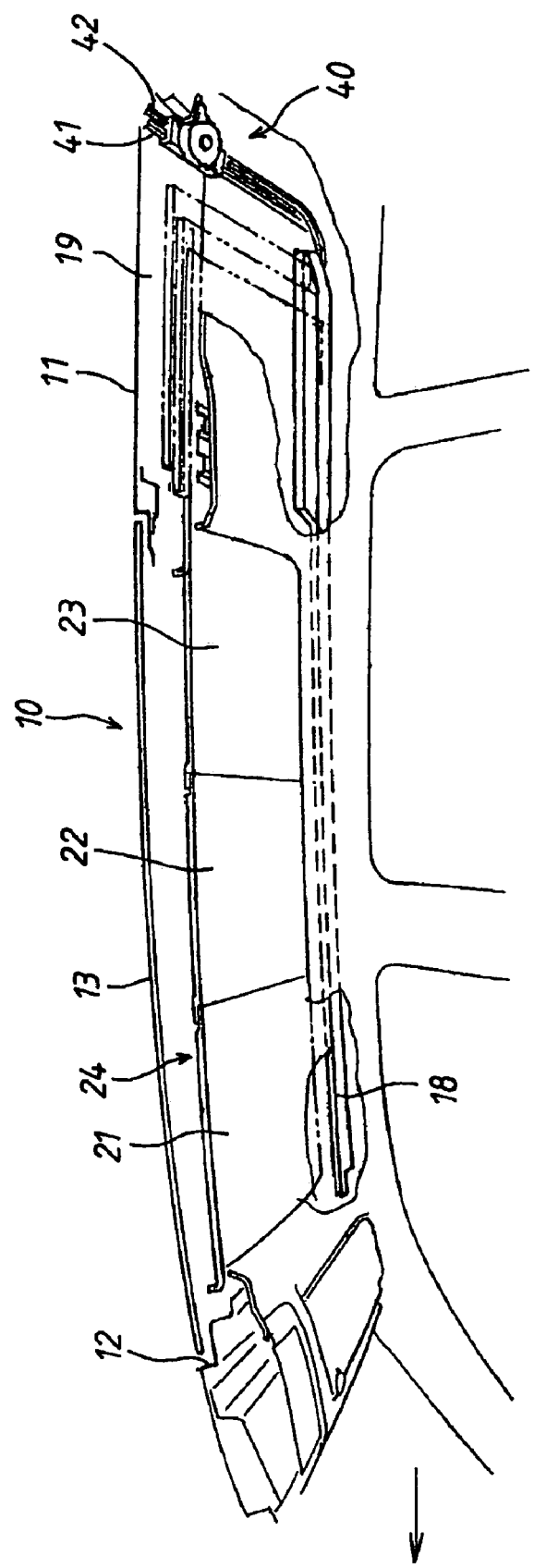
FIG. 1 is a perspective view when a whole sunshade panel apparatus is viewed from inside of the vehicle according to a first embodiment of the present invention.

A first embodiment of the present invention will be explained referring to FIGS. 1-8. FIG. 1 shows a state where a sunroof apparatus 10 provided at a roof portion 11 of a vehicle is sectioned at the central portion in a width direction of the vehicle. A direction indicated with an arrow is a forward direction of the vehicle. On the roof portion 11 of the vehicle, an opening 12 is formed. A panel 13 made from a transparent glass plate is mounted to the opening 12 so that sunlight passes through the panel 13 into a vehicle compartment. Below the panel 13, a sunshade panel apparatus 24 is provided in order to adjust light shading, which includes plural (e.g., three) sunshade panels 21, 22 and 23. The sunshade panel 21 is also mentioned as a first sunshade panel 21 provided at forefront in a forward and a backward direction of the vehicle within the sunshade panel apparatus 24, the sunshade panel 22 is also mentioned as a second sunshade panel 22 interposed the sunshade panel 21 and the sunshade panel 23, and the sunshade panel 23 is also mentioned as a third sunshade panel 23 provided at a rearmost in a forward and a backward direction of the vehicle within the sunshade panel apparatus 24.

Figure 2:
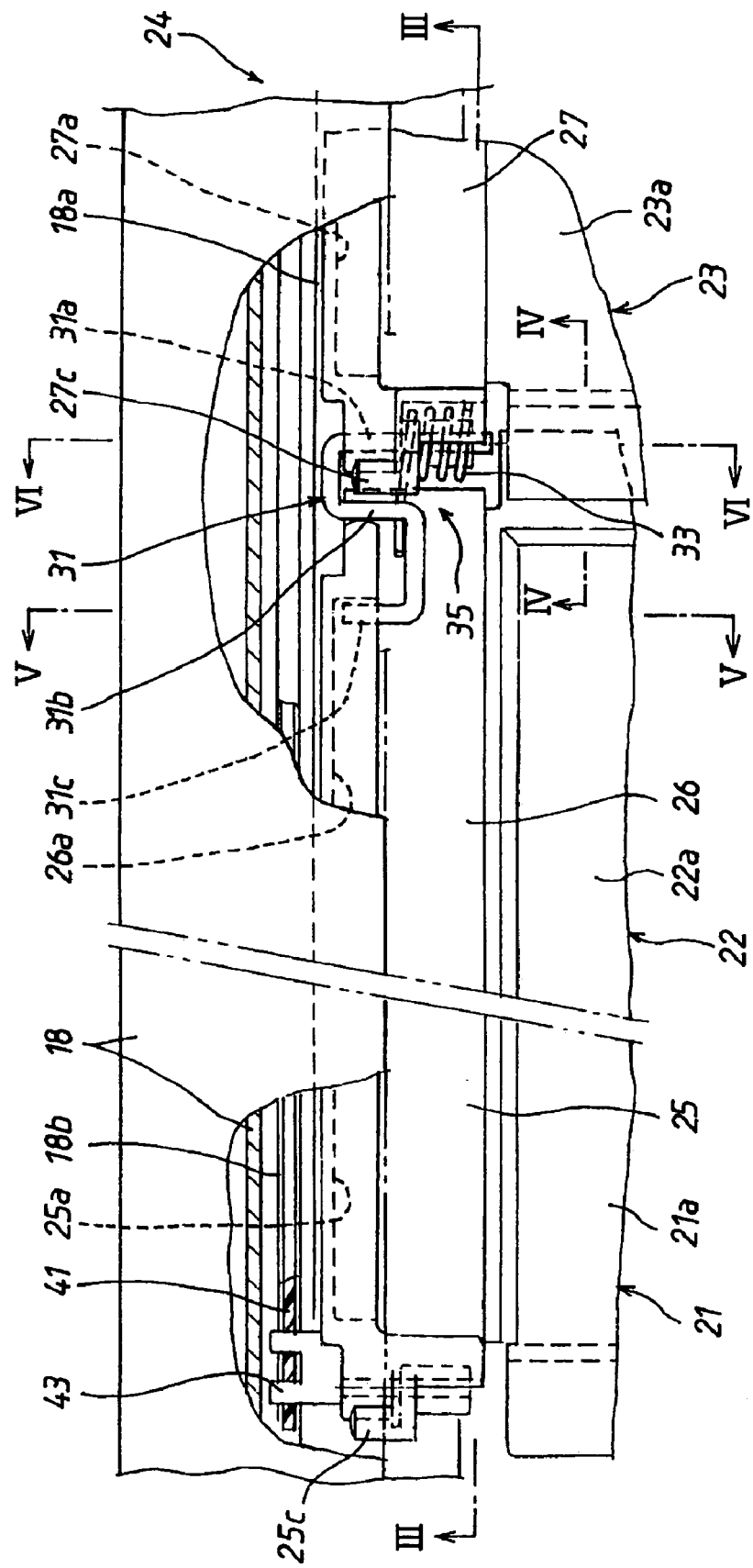
FIG. 2 is a view showing a part of the sunshade panel apparatus in a cross sectional state taken along its plane.
Figure 3:
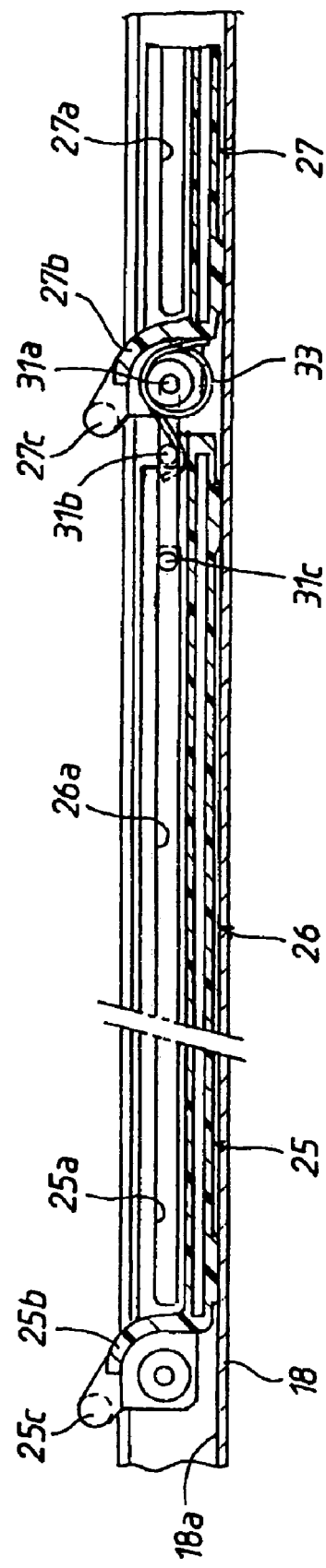
FIG. 3 is a cross sectional view taken along the line III-III of FIG. 2.
Figure 4:
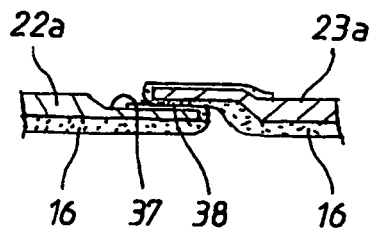
FIG. 4 is a cross-sectional view taken along the line IV-IV of FIG. 2.
Figure 5:
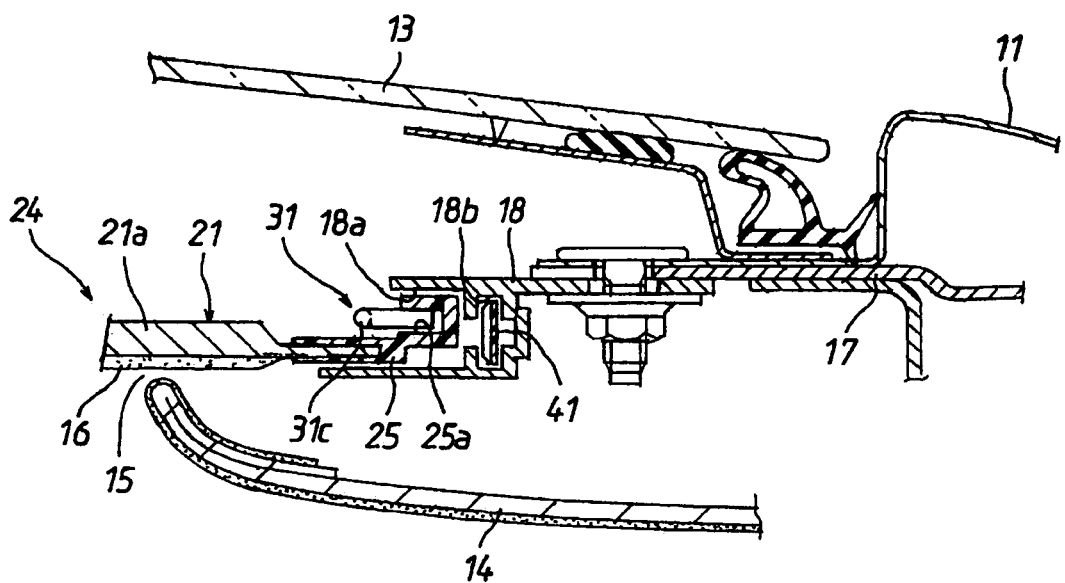
FIG. 5 is a cross sectional view taken along the line V-V of FIG. 2.
Figure 6:
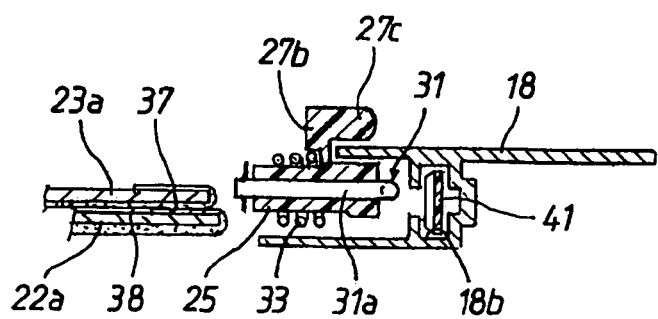
FIG. 6 is a cross sectional view taken along the line VI-VI of FIG. 2.

The sunshade panels 21, 22, 23 are to open and close a skylight portion 15 provided at an interior portion 14 mounted on a ceiling portion of the vehicle as shown in FIG. 5. Further, as shown in FIGS. 2-4, the sunshade panels 21, 22, 23 respectively includes: panel main bodies 21a, 22a, 23a, which is made of resin, for example, polyurethane; and slide members 25, 26, 27 made of resin attached to end portions of the panel main bodies 21a, 22a, 23a in the width direction of the vehicle. The surface portions of the panel main bodies 21a, 22a, 23a exposed to the vehicle compartment, and the end portions of the panel main bodies 21a, 22a, 23a in the front-rear direction of the vehicle are covered with a top surface member 16.

An attachment bracket 17 is fixed to the ceiling portion at the inside the roof portion 11. To the attachment bracket 17, a couple of guide rails 18 extending in parallel in a front-rear direction of the vehicle are provided at one side and the other side of the opening 12 in the width direction of the vehicle. Specifically, in this embodiment, two guide rails 18 are provided at the opening 12 so as to be paired in the width direction of the vehicle. To the ceiling portion inside the roof portion 11, a panel-housing portion 19 is provided at the rear portion of the guide rail 18 in a front-rear direction of the vehicle. On each of the guide rails 18, a guide groove 18a is formed in a U-shape in a manner where the guide groove 18a formed at the guide rail 18 provided at one side faces the guide groove 18a formed at the guide rail 18 provided at the other side. Each of the slide members 25, 26, 27 of the sunshade panels 21, 22, 23 is supported by and guided in the guide grooves 18a so as to slide in the front-rear direction of the vehicle.

In a closing state, the sunshade panels 21, 22, 23 are arranged adjacent to one another within one and the same plane in an extended state. In an open state, the sunshade panels 21, 22, 23 are arranged to be overlapped in parallel to one another.

Hereinafter, a specific structure of the sunshade panel apparatus 24 will be described on the basis of FIGS. 2-7. A connecting mechanism 35 (second connecting member) for connecting the first and the second sunshade panels 21, 22 adjacent to each other (i.e. sunshade panels arranged at the foremost portion and the center portion in the forward and rearward directions of the vehicle) is substantially in an identical structure to a connecting mechanism 35 (first connecting member), serving as a connecting member, for connecting the second and the third sunshade panels 22, 23 adjacent to each other (i.e. sunshade panels arranged at the middle portion and the rearmost portion in the forward and rearward directions of the vehicle). Therefore, for the explanatory purpose, the connecting mechanism 35 for connecting the second and third sunshade panels 22, 23 shown in FIG. 2 will be described.

In FIGS. 2-4, each of the slide members 25, 26, 27 attached to each end of the sunshade panels 21, 22, 23 slidably guided within the guide grooves 18a, 18a of the guide rails 18, 18. On the slide members 25, 26, 27, engagement grooves 25a, 26a, 27a are respectively formed to be in parallel with the guide grooves 18a. The engagement grooves 25a, 26a, 27a provided at the one guide rail, 18 inwardly face the engagement grooves 25a, 26a, 27a provided at the other guide rail 18.

The heights of the slide members 25, 26, 27 are set to be slightly shorter than the height of the guide groove 18a. The slide members 25, 26, 27 are slidably guided within the guide groove 18a with providing a slight clearance between the slide members 25, 26, 27 and the guide groove 18a in a vertical direction. Further, the widths of the engagement grooves 25a, 26a, 27a are set to fall within the range of the heights of the slide members 25, 26, 27.

The slide members 25, 26, 27 are formed with engagement portions 25b, 26b, 27b on the respective front ends in the front-rear direction of the vehicle. On the engagement members 25b, 26b, 27b, engagement shaft portions 25c, 26c, 27c each protruding above the guide rails 18 as well as protruding outward in the width direction of the vehicle are provided as illustrated in FIG. 3.

At the engagement portion 27b (26b) formed at the slide member 27 (26) of the sunshade panel 23 (22), provided at the rearward of two sunshade panels 22, 23 (21, 22) adjacent to each other, a one end shaft portion 31a, serving as a supporting portion and a supporting shaft, of a connection link member 31 is rotatably supported around a horizontal axis line which is in parallel to the width direction of the vehicle at the level of the height of the engagement groove 26a (25a) formed on the slide member 26 (25) of the sunshade panel 22 (21), provided at the frontward of the two sunshade panels 22, 23 (21, 22).

The connection link member 31 is formed by bending a round bar, having a diameter slightly smaller than the width of the engagement grooves 25a, 26a, 27a, into an approximately S-shape, and forming. Specifically, the one end shaft portion 31a is formed at one end portion of the connection link member 31, a center shaft part 31b, serving as a shaft, is formed at the central portion of the connection link member 31, and the other end shaft portion 31c, serving as an engagement portion and an engagement shaft, is formed at the other end portion of the connection link member 31, and the one end shaft portion 31a, the center shaft part 31b and the other end shaft portion 31c are parallel in a vertical direction and aligned in a horizontal direction. Normally, the connection link member 31 is held in a horizontal posture where the three shaft parts 31a, 31b, 31c are aligned with the engagement grooves 25a, 26a, 27a along one straight line. The one end shaft portion 31a of the connection link member 31 is rotatably supported by the engagement portion 27b (26b) as described above. The other end shaft portion 31c is slidably engaged with the engagement groove 26a (25a) formed on the slide member 26 of the sunshade panel 22 (21) located at a forward side of the vehicle. The center shaft part 31b is brought into contact with the rear end surface of the slide member 26(25) of the sunshade panel 22 (21) located at the forward side of the vehicle with the connection link member 31 held in a horizontal posture.

In the state where three sunshade panels 21, 22, 23 are arranged adjacent to each other within one and the same plane (in a closing state), the other end shaft portion 31c is engaged with one end of the engagement groove 26a (25a), whereas the center shaft part 31b is engaged with the rear end surface of the slide member 26(25). As a result, the rear end portion of the slide member 26(25) is sandwiched between the center shaft part 31b and the other end shaft portion 31c of the connection link member 31, so that the relative movement in the forward and rearward directions of the vehicle of the slide member 26(25) of the sunshade panel 22(21) located at the forward side of the vehicle is restricted.

To the one end shaft portion 31a of the connection link member 31, a torsion spring 33 serving as a biasing member is fitted. One end of the torsion spring 33 engages with the side of the slide member 27, and the other end thereof engages the center shaft part 31b. By means of the torsion spring 33, a rotational moment is applied to the connection link member 31 in a clockwise direction in FIG. 3. Because of this rotational moment, the other shaft portion 31c of the connection link member 31 contacts the upper surface of the engagement groove 26a(25) formed at the slide member 26(25), whereas the slide member 27(26) supporting one end shaft portion 31a of the connection link member 31 contacts the lower surface of the guide groove 18a. As a result of this, the slide member 27(26) is pressed by a proper biasing force against the lower surface of the guide groove 18a, caused by its own weight and the biasing force applied by the torsion spring 33.

The connection link member 31 including three shaft parts 31a, 31b, 31c and the torsion spring 33 described above together constitutes the connecting mechanism 35 for connecting the sunshade panels 22, 23 (21, 22) adjacent each other in the forward and rearward directions.

As described above, when the connection link member 31 is mounted to the adjacent two sunshade panels at their rearward sides of the vehicle, the engagement portion 25b of the sunshade panel 21 located at the foremost portion in the closing direction, and the engagement groove 27a of the sunshade panel 23 located at the rearmost portion in the closing direction are not needed virtually. However, in this embodiment, in order to employ the same structure to all of three sunshade panels 21, 22, 23, these sunshade panels are intentionally illustrated with the engagement portion 25b (engagement shaft part 25c) and the engagement groove 27a provided thereto.

At the rear end portions of the sunshade panel main body 22a(21a) located at the frontward side toward the direction along which two adjacent sunshade panels 22, 23 (21, 22) close to each other, as shown in FIG. 4, a mating part 37 of which upper surface is cut away over the width direction of the vehicle to have a thin thickness is formed. At the front end portion of the sun shad panel main body 23a(22a) located at the rearward side of the vehicle, a mating part 38 of which lower surface is cut away over the width direction of the vehicle to have a thin thickness is formed. These mating parts 37, 38 can be mated with each other in an overlapped state within the range of the thickness substantially the same as the thickness of the sunshade panels 21, 22, 23.

Figure 7:
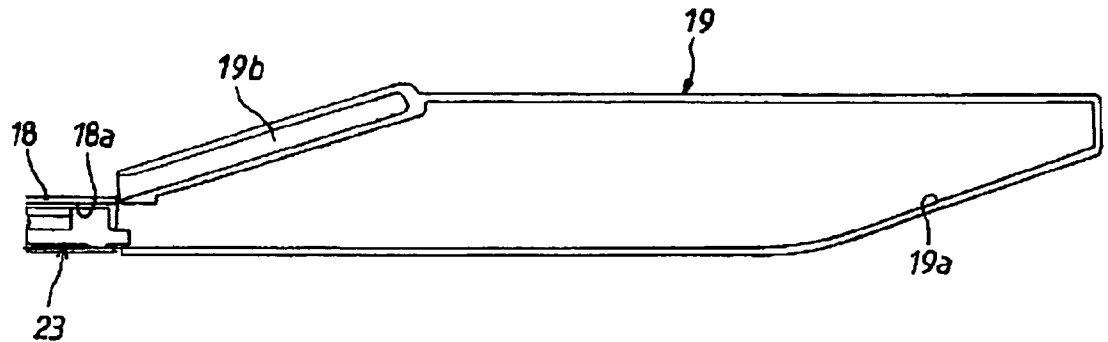
FIG. 7 is a view showing a structure of a panel-housing portion.
Figure 8A:
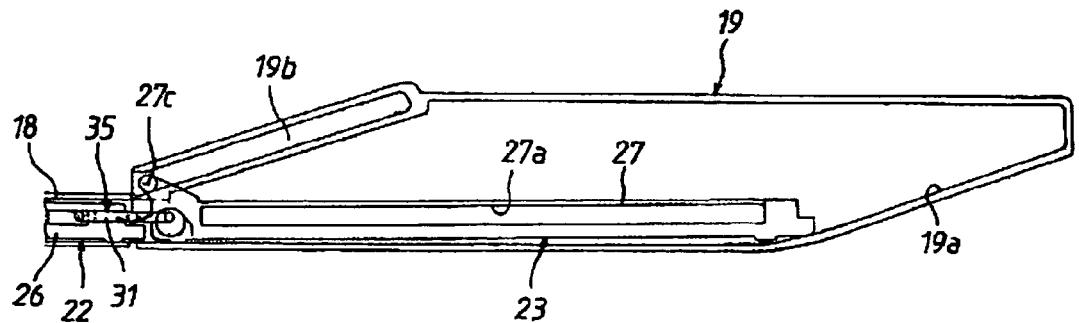
FIGS. 8A, 8B and 8C are views showing the sunshade panel apparatus in an operated state.
Figure 8B:
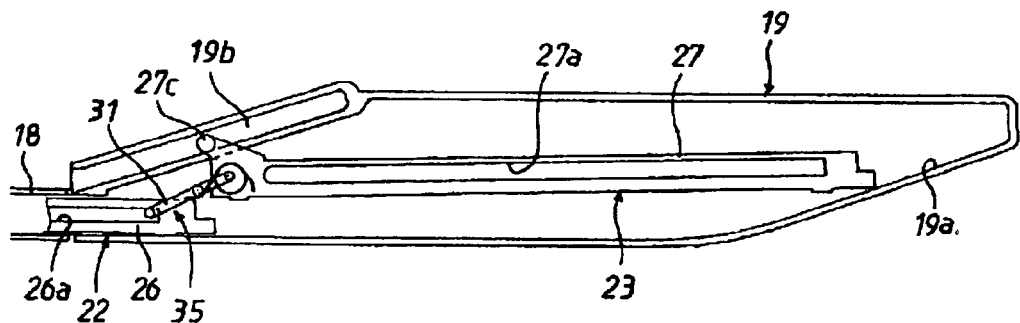
Figure 8C:
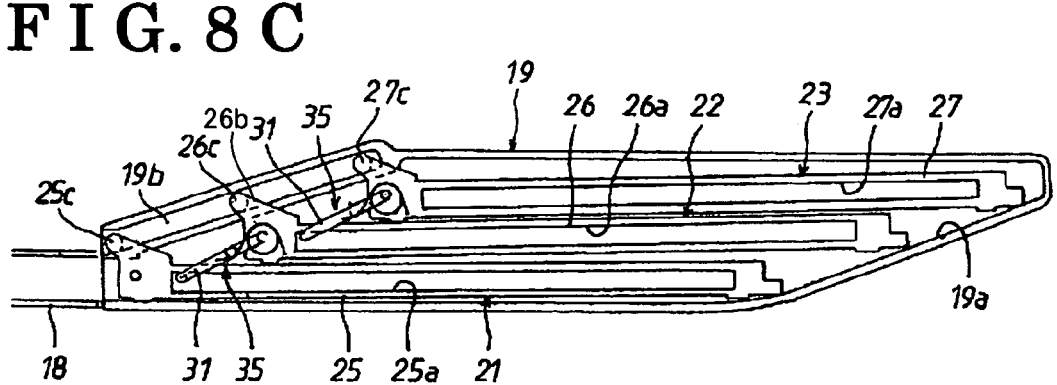

At the rear end portion of the panel housing portion 19 provided at the guide rail 18 at the rearward of the vehicle, as shown in FIG. 7, a slant guide surface 19a is formed. The slant guide surface 19a engages with each rear end of the slide members 25, 26, 27 of the sunshade panels 21, 22, 23. At the front end portion of the panel housing portion 19, a slant guide groove 19b is formed. The slant guide groove 19b engages with the engagement shaft portions 25c, 26c, 27c provided at the individual front ends of the slide members 25, 26, 27. The slant guide groove 19b is provided above the guide rail 18 to open frontward in the closing direction.

The slant guide surface 19a and the slant guide groove 19b are formed to be substantially parallel to each other, as well as gradually rise toward the rearward of the vehicle. Due to this structure, when the sunshade panels 21, 22, 23 are retracted to be stored, the rear end portion of the slide member 27 of the last (third) sunshade panel 23 runs onto the slant guide surface 19a, and at the same time, the engagement shaft part 27c provided at the front end portion of the slide member 27 engages with the slant guide groove 19b. Then, the sunshade panel 23 is lifted up with its substantially horizontal posture kept as it is as against the biasing force applied by the torsion spring 33 to the connection link member 31 of the connecting mechanism 35 while pivoting the connection link member 31, so as to create a space below thereof for storing the sunshade panels 21, 22 following the sunshade panel 23. The slant guide surface 19a and the slant guide groove 19b provided at the opposite end portions of the panel housing portion 19 in the frontward and rearward directions of the vehicle together constitute the slant guide part.

The panel housing portion 19 is equipped with a drive unit 40 in its frontward and rearward directions (in the storage direction) that uses an electric motor as a drive source, as shown in FIG. 1. The drive unit 40 operates a pair of geared cables 41, 42 to move in opposite directions to each other. The pair of geared cables 41, 42 are guided to an unillustrated guide members individually provided at the opposite end portions of the roof portion 11 and bent thereat, and then, as shown in FIG. 5, are penetrated through cable guide holes 18b formed on the guide rails 18. The top end portions of the pair of geared cables 41, 42 are connected via a connection tool 43 (see FIG. 2) to the slide member 25 of the sunshade panel 21 located at the foremost position seen toward the storage direction (toward the opening direction). In this structure, when the pair of geared cables 41, 42 is driven by the drive unit 40, the individual end portions of the pair of geared cables 41, 42 are moved synchronous with each other in the same direction in the frontward and rearward directions of the vehicle. As a result, the slide member 25 of the first sunshade panel 21 is slid toward the pulled direction or the pushed direction.

Next, an operation in the first embodiment described above will be described. In the state where the sunshade panels 21, 22, 23 are closed, as shown in FIGS. 2 and 3, the sunshade panels 21, 22, 23 are arranged adjacent each other in an extended state within one and the same plane, where, as shown in FIG. 4, the individual end portions of the sunshade panels 21, 22, 23 are mated to be overlapped with one after another. In this state, the torsion spring 33 of the connecting mechanism 35 for connecting the first and second sunshade panels 21, 22 with each other and for connecting the second and third sunshade panels 22, 23 with each other brings the other end shaft portion 31c of the connection link member 31 into contact with the upper surface of the engagement grooves 25a, 26 of the slide members 25, 26. As a result of this, the slide members 26, 27 that supports the one end shaft portion 31a is biased downward, so as to be brought into contact with the lower surface of the guide groove 18a of the guide rail 18 by a proper biasing force. Thus, the plurality of sunshade panels 21, 22, 23 are held to be present on one and the same plane by their own weights and the biasing force applied by the torsion spring 33. In this manner, the sunshade panels 21, 22, 23 (slide members 25, 26, 27) are prevented from rattling within the guide grooves 18a due to the vibration of the vehicle.

To open the sunshade panels 21, 22, 23, for example, a switch for opening the sunshade panels disposed on an instrument panel in the vicinity of the driver. Then, the drive unit 40 is started, to synchronously move the top end portions of the pair of geared cables 41, 42 rearward of the vehicle. As a result, the foremost (first) sunshade panel 21 is pulled rearward in the closing direction, so that the sunshade panel 21 is slid rearward along the guide rail 18. Then, the sunshade panels 22, 23 are integrally slid rearward along the guide rail 18, and in turn, the rearmost (third) sunshade panel 23 is released from the guide rail 18, and is stored into the panel housing portion 19 (see FIG. 8A).

As the sunshade panel 23 located at a rearmost position in the storage direction (in the opening direction) is retracted within the panel housing portion 19, the rear end of the sunshade panel 23 runs onto the slant guide surface 19a, and at the same time, the engagement shaft part 27c thereof engages with the slant guide groove 19b. As a result, the rearmost sunshade panel 23 moves upward with its retracted and horizontal posture kept as it is, while rocking the connection link member 31 about one end shaft portion 31a.

When the rearmost sunshade panel 23 is lifted up to the position where a space capable of storing the center (second) sunshade panel 22 therein is created under the sunshade panel 23 (see FIG. 8B), the connection link member 31 is tilted at a predetermined angle, and the center shaft part 31b thereof departs from the rear end surface of the center sunshade panel 22, and is moved to the position above the upper surface of the sunshade panel 22. As a result of this, the restriction of the center sunshade panel 22 relative to the rearmost sunshade panel 23 is released, so that the relative movement of the center sunshade panel 22 relative to the rearmost sunshade panel 23 is enabled. Thus, due to the drive force exerted upon the foremost sunshade panel 21 rearward in the storage direction (in the opening direction), the center sunshade panel 22 is retracted within the panel housing portion 19 in such a manner as to slip under the rearmost sunshade panel 23. At this time, the other end shaft portion 31c of the connection link member 31 relatively slides within the engagement groove 26a of the center sunshade panel 22.

Then, in turn, when the rear end of the center sunshade panel 22 is brought into contact with the slant guide surfaced 19a within the panel housing portion 19, and at the same time, the engagement shaft part 27c thereof is retracted to the position where it engages with the slant guide groove 19b, as describe above, the center sunshade panel 22 is moved upward as retracting. At this time, as the center sunshade panel 22 lifts up, the foremost sunshade panel 21 is also lifted up.

When the center sunshade panel 22 is lifted to a predetermined height, the connection link member 31 is tilted to the position where the center shaft part 31b is located above the foremost sunshade panel 21. As a result of this, the foremost sunshade panel 21 slides relative to the center sunshade panel 22, so that the foremost sunshade panel 21 is retracted within the panel housing portion 19 so as to slip under the center sunshade panel 22.

In the manner as described above, as shown in FIG. 8C, three sunshade panels 21, 22, 23 are stored into the panel housing portion 19 so as to be overlapped parallel to one after another, so that the skylight portion 15 is fully opened. When the sunshade panels 21, 22, 23 are opened, this opening state is detected by unillustrated detection means, and the drive unit 40 is stopped.

On the other hand, when the switch for closing the sunshade panels is operated while the sunshade panels 21, 22, 23 are opened, the drive unit 40 is started in the direction reversed to the direction described above, so that the foremost (first) sunshade panel 21 in the closing direction is pushed frontward via the geared cables 41, 42. As a result of this, the slide member 25 of the foremost sunshade panel 21 is again engaged with the guide rail 18 and is slid frontward in the fully closing direction along the guide rail 18.

At this time, the top end shaft portion 31c of the connection link member 31 disposed at the front end portion of the center sunshade panel 22 slides along the engagement groove 25a of the foremost sunshade panel 21. When the foremost sunshade panel 21 is forwarded up to a predetermined position, the top end shaft portion 31c of the connection link member 31 engages with the rear end portion of the engagement groove 25a, so as to transmit the forward drive force to the center sunshade panel 22.

When the foremost sunshade panel 21 is closed to be in a predetermined position and comes out from below the center sunshade panel 22, the center sunshade panel 22 is guided by the slant guide surface 19a and the slant guide groove 19b so as to move down as being pulled frontward. As the center sunshade panel 22 moves down, the posture of the connection link member 31 is changed from the tilted state into the horizontal state where the connection link member 31 is aligned with the engagement grooves 25a, 26a, and the slide member 26 of the center sunshade panel 22 is engaged with the guide rail 18 accordingly. As a result, the foremost and center sunshade panels 21, 22 are slid frontward within one and the same plane along the guide rail 18.

Thereafter, in the same manner as described above, the slide member 27 of the rearmost sunshade panel 23 is pulled by the connection link member 31 so as to be engaged with the guide rail 18, and is slid frontward within one and the same plane as the preceding sunshade panels 21, 22 along the guide rail 18. When the foremost sunshade panel 21 is forwarded up to the foremost end position, the skylight portion 15 is closed by three sunshade panels 21, 22, 23. This closing state is detected by an unillustrated detection means, and the drive unit 40 is stopped.

According to the first embodiment described above, because a rotational moment is applied to the connecting mechanism 35 by the torsion spring (biasing member) 33 biasing the sunshade panels 21, 22, 23 against the lower surface of the guide groove 15a of the guide rail 15, the sunshade panels 21, 22, 23 can be held at positions located within one and the same plane, and at the same time, the sunshade panels are prevented from rattling due to the vibration of the vehicle. Further, a component of the force by the slant guide is not exerted upon the sunshade panels 21, 22, 23. Thus, the slide resistance to the sunshade panels 21, 22, 23 can be reduced, so that the sunshade panels 21, 22, 23 can be slid smoothly with a small drive force.

Further, the connection link member 31 that constitutes the connecting mechanism 35 is constituted by bending a round bar having a diameter slightly smaller than the groove width of the engagement grooves 25*a*, 26*a*, 27*a* substantially into the shape of letter S, and forming, at its opposite ends and center, the one end shaft portion 31*a*, the center shaft part 31*b*, and the other end shaft portion 31*c* to be aligned along one straight line. Thus, the connecting mechanism 35 can be constituted easily and at low cost. Further, in the state where the sunshade panels 21, 22, 23 are closed, the connecting mechanism 35 can be accommodated in the guide rail 15 within its height. This structure contributes to reduce the space in the height direction of the sunshade panel apparatus 24.

Figure 9:
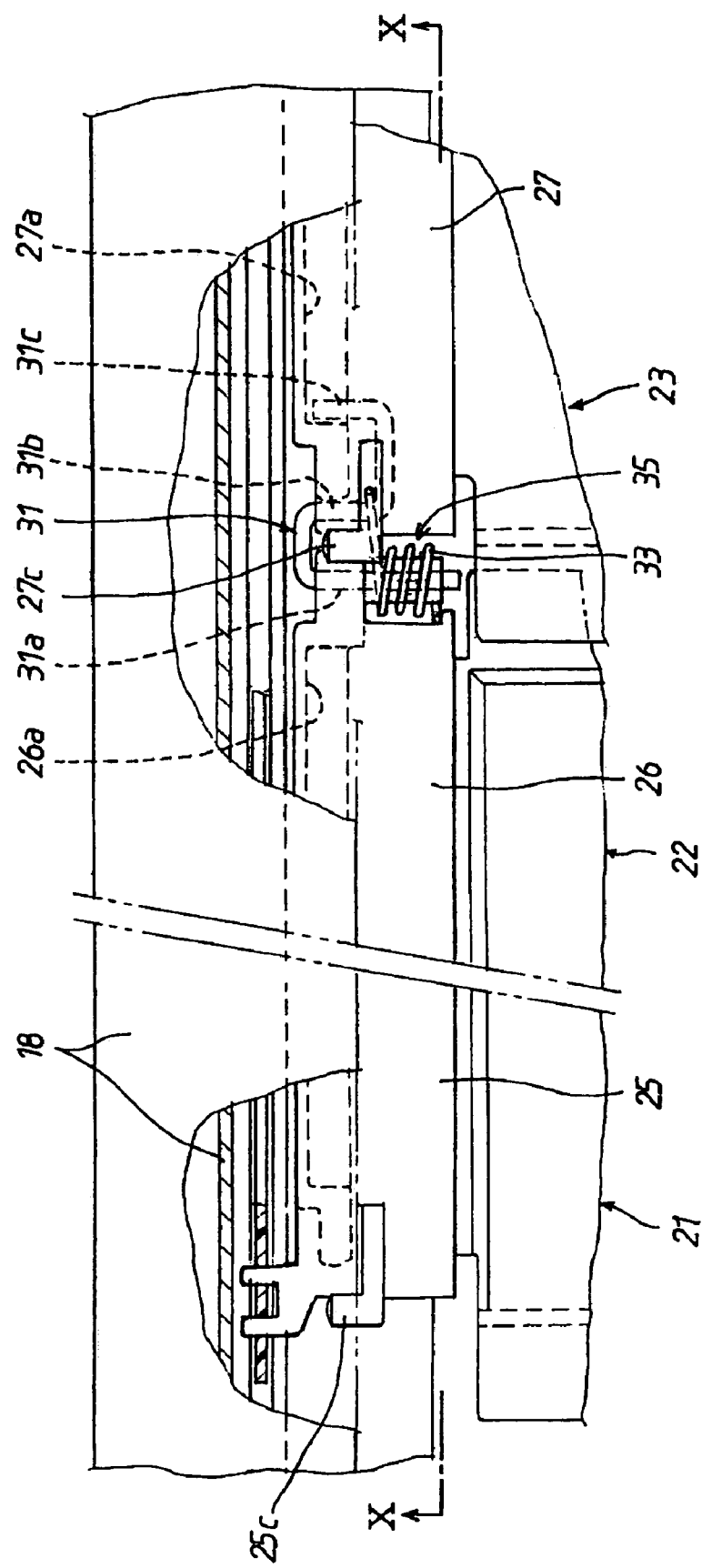
FIG. 9 is a view showing a part of the sunshade panel apparatus in a cross sectional state taken along its plane according to a second embodiment of the present invention.
Figure 10:
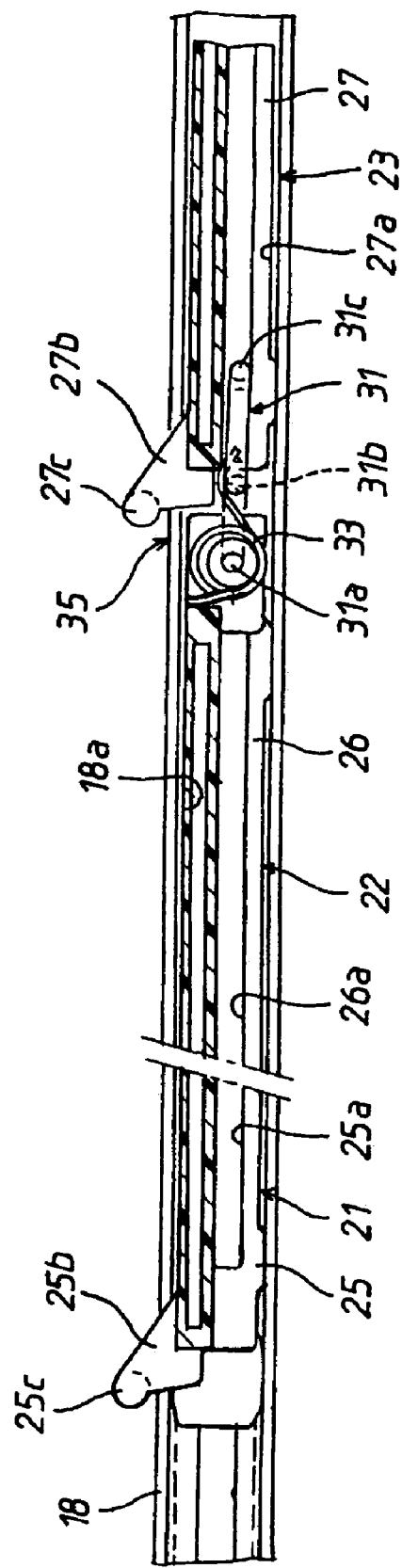
FIG. 10 is a cross-sectional view taken alone the line X-X of FIG. 9.

FIGS. 9 to 11 illustrate a second embodiment of the present invention. The second embodiment differs from the first embodiment on the point that, whereas in the first embodiment, the connecting mechanisms 35, which connect the sunshade panels 21, 22, 23 provided adjacent to one another, are respectively provided at the front end portions of the sunshade panels 22, 23, in the second embodiment, connecting mechanisms 35 are respectively provided at the rear end portions of the sunshade panels 21, 22. Here, the front end portions are positioned at a front end of each panel viewed from the closing direction of the sunshade panels 22 and 23, and the rear end portions are positioned at a rear end of each panel viewed from the opening direction of the sunshade panels 22 and 23. Therefore, hereinafter, the differences therebetween will be described, and the same constituent elements of the same structures are denoted by the same reference numerals and their detailed descriptions will be omitted.

In FIG. 9, at the individual rear end portions of slide members 26(25) attached to both end portions of the sunshade panel 22(21) in the width direction of the vehicle, a one end shaft portion 31*a*, serving as a supporting portion and a supporting shaft, of a connection link member 31 is rotatably supported around a horizontal axis parallel to the width direction of the vehicle, whereas an other end shaft portion 31*c*, serving as an engagement portion and an engagement shaft, of the connection link member 31 is extended rearward and is slidably engaged with an engagement groove 27*a*(26*a*) formed on the slide member 27(26) of the sunshade panel 23(22). As is the case of the first embodiment described above, the connection link member 31 is constituted by bending a round bar having a diameter slightly smaller than the groove width of the engagement groove 27*a* substantially into the shape of letter S. The round bar is formed at its opposite ends and center, with the one end shaft portion 31*a*, the center shaft portion 31*b*, which serves as a shaft, and the other end shaft portion 31*c*. The one end shaft portion 31*a*, the center shaft portion 31*b* and the other end shaft portion 31*c* are arranged in parallel to one another. Normally, the connection link member 31 restricts the relative movement of the subsequent sunshade panel 23(22) by use of the center shaft part 31*b* and the other end shaft portion 31*c*. Once the connection link member 31 is tilted at a predetermined angle, it allows the relative movement of the subsequent sunshade panel 23 (22).

A torsion spring 33 is fitted on the one end shaft portion 31*a* of the connection link member 31. The torsion spring 33 exerts a rotational moment to the connection link member 31 in a clockwise direction in FIG. 10. This rotational moment brings the other shaft portion 31*c* of the connection link member 31 into contact with the lower surface of the engagement groove 27*a* (26*a*) formed at the slide member 27 (26) of the subsequent sunshade panel 23 (22).

In the second embodiment, the connection link member 31 is attached to the forward sides or ends of two adjacent sunshade panels as viewed from the closing direction. Therefore, there is virtually no need of providing an engagement groove 25*a* and an engagement portion 25*b* at the foremost (first) sunshade panel 21.

Figure 11A:
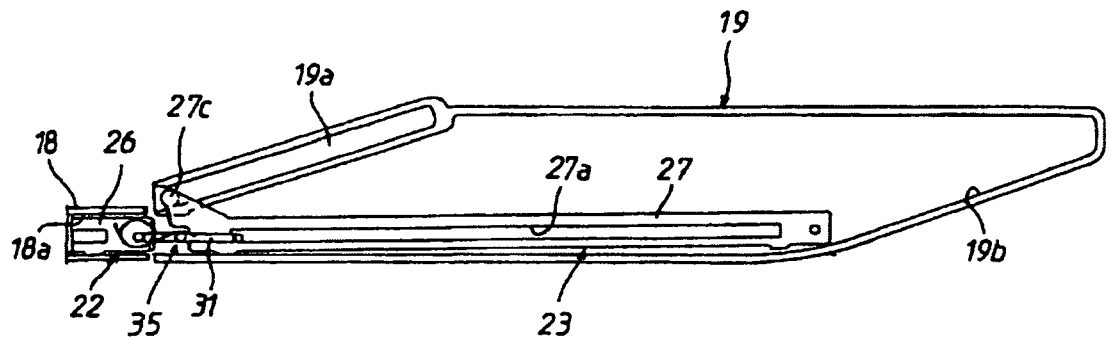
FIG. 11 is a view showing the sunshade panel in an operated state.
Figure 11B:
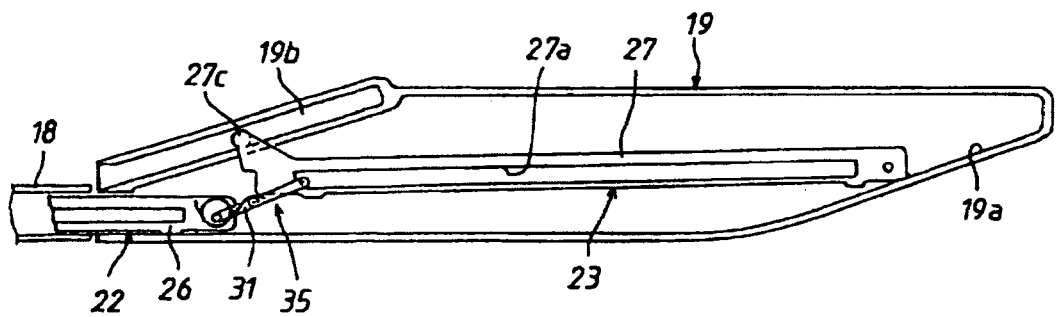
Figure 11C:
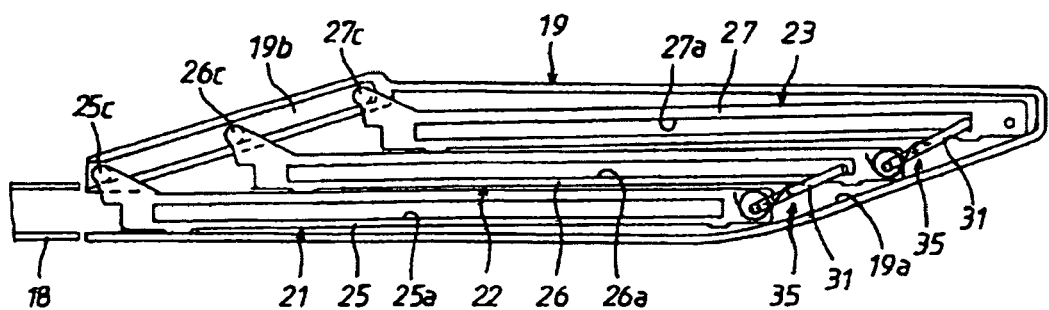
Figure 12:
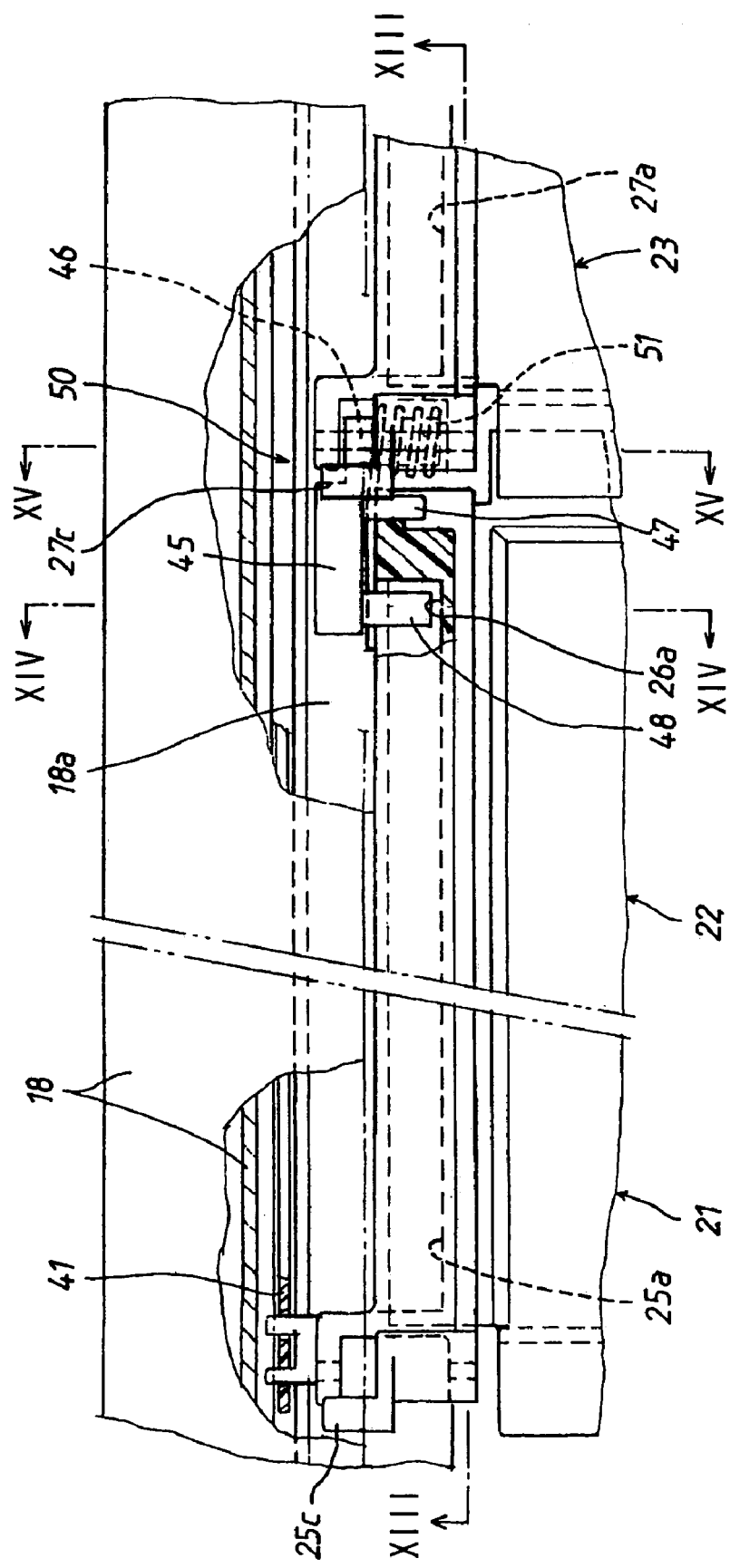
FIG. 12 is a view showing a part of the sunshade panel apparatus in a cross sectional state taken along its plane according to a third embodiment of the present invention.
Figure 13:
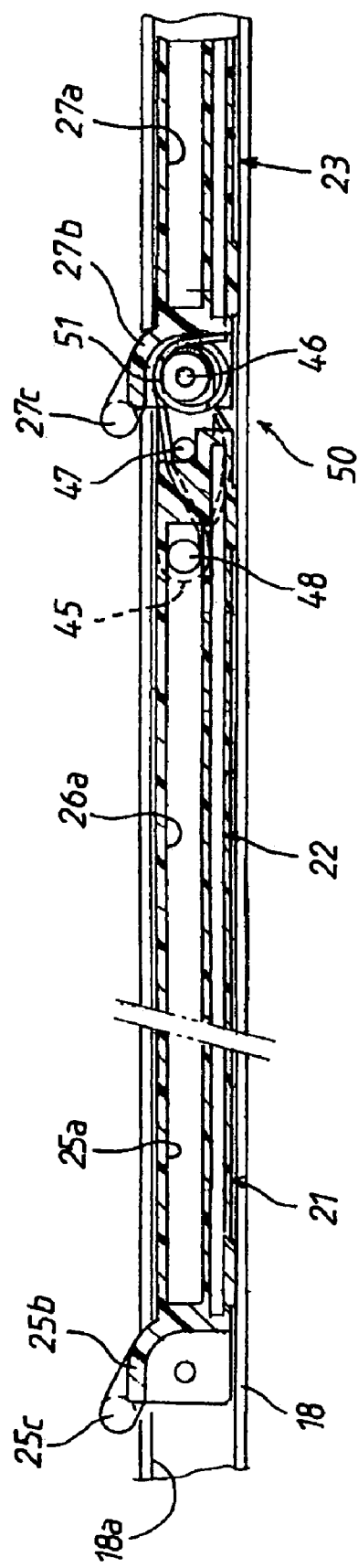
FIG. 13 is a cross-sectional view taken alone the line XIII-XIII of FIG. 12.
Figure 14:
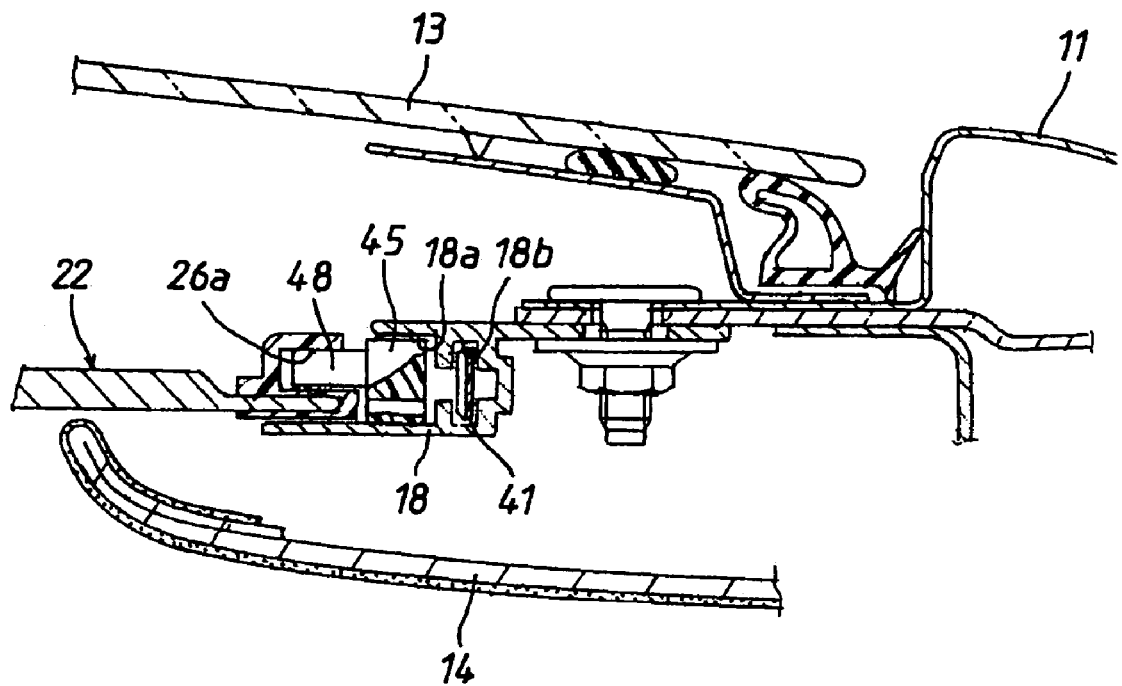
FIG. 14 is a cross-sectional view taken alone the line XIV-XIV of FIG. 12.
Figure 15:
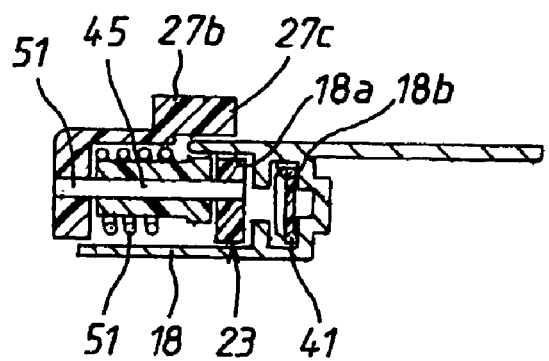
FIG. 15 is a cross-sectional view taken alone the line XV-XV of FIG. 12.

In the second embodiment as well, as is the case of the first embodiment, in the state where the sunshade panels 21, 22, 23 are closed, when the foremost (first) sunshade panel 21 is driven by the drive unit 40 to be pulled rearward in the storage direction (in the opening direction), the plurality of sunshade panels 21, 22, 23 are integrally slid rearward along the guide rails 18, so that the rearmost (third) sunshade panel 23 is stored into the panel housing portion 19 (see FIG. 11(A)).

When the rearmost sunshade panel 23 is pulled within the panel housing portion 19 in a predetermined amount, the rear end portion thereof runs onto the slant guide surface 19*a*, and at the same time, the engagement shaft part 27*c* engages with the slant guide groove 19*b*. The rearmost sunshade panel 23 moved rearward and upward while pivotably moving the connection link member 31.

Once the rearmost sunshade panel 23 is lifted up to the position where a space capable of storing the center (second) sunshade panel 22 therein is created below the sunshade panel 23, the connection link member 31 is inclined until the center shaft part 31*b* of the connection link member 31 is moved to the position above the upper surface of the sunshade panel 22. Due to the drive force applied to the foremost sunshade panel 21 for the rearward movement, the center sunshade panel 22 is stored into the panel housing portion 19 in such a manner as to get into under the rearmost sunshade panel 23 (FIG. 11(B)).

Further, when the rear end of the center sunshade panel 22 is brought into contact with the slant guide surface 19*a* located inside the panel housing portion 19, and the engagement shaft part 27*b* thereof is pulled up to the position where the engagement shaft part 27*b* engages with the slant guide groove 19*b*, as is the case described above, the center sunshade panel 22 is moved upward as being pulled rearward. Then, when the center sunshade panel 22 is lifted upward at a predetermined amount and the connection link member 31 is tilted at a predetermined angle, the foremost sunshade panel 21 is stored into the panel housing portion 19 in such a manner as to get into under the center sunshade panel 22.

In the manner as described above, as shown in FIG. 11(C), the three sunshade panels 21, 22, 23 are stored into the panel housing portion 19 so as to overlap in parallel to one another and turn to opening states.

According to the second embodiment described above, the same effects as of the first embodiment can be obtained.

FIGS. 12 to 15 illustrate a third embodiment of the present invention. The third embodiment differs from the first and second embodiments in the structure of connecting mechanism for connecting adjacent sunshade panels. Specifically, in the first and second embodiments, the connecting mechanism 35 is constituted by the connection link member 31 formed by bending a round bar. On the other hand, in the third embodiment, connecting mechanism 50 is constituted by providing three shaft portions 46, 47, 48 onto a plate-like link member 45 to be parallel to one another and aligned along one straight line. Specifically, a shaft portion 46, serving as a supporting portion and a supporting shaft, provided at one end (rear end portion) of the link member 45 is rotatably supported to the individual front end portions of the second (center) and third (rearmost) sunshade panels 22, 23. A shaft part 48, serving as an engagement portion and an engagement shaft, provided at the other end of the link member 45 (at its front end side) is engaged with engagement grooves 25*a*, 26*a* of adjacent sunshade panels 21, 22 located at front sides. A shaft part 47, serving as a shaft, provided at the center of the link member 45 is detachably brought into contact with the rear end surfaces of the sunshade panels 21, 22.

The torsion spring 51 is fitted on the one end shaft portion 46. One end of the torsion spring 51 is engaged at the side of the sunshade panels 22, 23, and the other end thereof is engaged with the other end shaft portion 48. As a result, torsion spring 51 exerts a rotational moment to the link member 45 in a clockwise direction in FIG. 13. This rotational moment brings the sunshade panels 22, 23 that support the one end shaft portion 46 into contact with the lower surface of the guide groove 18a of the guide rail 18, so that the sunshade panels are prevented from rattling.

The function of the connecting mechanism 50 is the same as the connecting mechanism 35 described in the first embodiment, and thus, the description of its operation in the third embodiment will be omitted.

In the embodiments described above, the sunshade panel apparatus 24 is constituted with the three sunshade panels 21, 22, 23. The present invention is also applicable to apparatuses including at least two or more sunshade panels. Further, the panel 13 made from a transparent glass plate and provided at the roof opening 12 may be a fixed panel or a movable panel.

Further, in the embodiments described above, the sunshade panels 21, 22, 23 are constituted by the sunshade panel main bodies 21a, 22a, 23a, the slide members 25, 26, 27, and the like, respectively. Alternatively, the sunshade panel main bodies and the slide members may be respectively in an integral structure.

Further, in the embodiments described above, an example where the drive unit 40 drives the sunshade panels 21, 22, 23 to open and close has been described. However, the present invention is not limited thereto. The present invention is also applicable to a structure where the sunshade panels 21, 22, 23 are manually opened and closed. In the embodiments described above, the direction shown by the arrow in FIG. 1 is defined as a forward direction of the vehicle. Alternatively, the direction shown by the arrow in FIG. 1 may be defined as a rearward direction of the vehicle.

The specific structures described in the foregoing embodiments merely illustrate examples of the present invention, and the present invention is not limited to these specific structures. It is a matter of course that various modifications may be made as far as not departing from the gist of the present invention.

According to the embodiments, a slant guide part for moving the sun shade panel sent from the guide rails to the panel storage part upward in a parallel direction is provided to the opposite end portions of the panel storage part in the forward and rearward directions of the vehicle. The connecting member for connecting sun shade panels adjacent to each other is constituted by a supporting portion rotatably supported about a horizontal axis line parallel to the vehicle width direction and provided to one of the sun shade panels adjacent to each other, an engagement part slidably engaged with the engagement groove provided to the other one of the sunshade panels adjacent to each other, and a biasing member for exerting a rotational moment about the supporting part to the engagement part. The sun shade panels stored in the panel storage part can be lifted up along the slant guide while sliding the connecting means. Unlike the conventional cases, there is no need of always applying a component of the force to the sun shade panels during when they are slid, and thus, the slide resistance of the sun shade panels is prevented from being increased. Therefore, the sun shade panels can be stably slid with a small drive force.

Further, a rotational moment is applied to the connecting member by the biasing member, and this rotational moment can bias the sun shade panels against the guide rail. As a result, the sun shade panels can be prevented from rattling due to the vibration of the vehicle.

According to the embodiments, the first connecting member is held in a posture parallel to the guide rail and restrains a relative movement of the second and third sunshade panels when the second and third sunshade panels are at the closing positions, in which the second and third sunshade panels are arranged adjacent to each other within the same plane, and the first connecting member is held in a posture tilted against the guide rail and allows the relative movement of the second and third sunshade panels when the second and third sunshade panels are at the opening positions, in which the second and third sunshade panels are arranged to overlap each other in parallel. Therefore, when the sun shade panels adjacent to each other are located within one and the same plane, the plurality of sun shade panels can be synchronously slid by the connecting member. Further, when the connecting member is in the tilted state, the sun shade panels can be relatively moved with the plurality of sun shade panels overlapped with one after another.

According to the embodiments, wherein the first connecting member further includes a connecting link member, the supporting portion is a supporting shaft provided at one end of the connecting link member and supported by the one of the second and third sunshade panels, the engagement portion is an engagement shaft provided at the other end of the connecting link member and slidably engaged with the engagement groove, the first connecting member further includes a shaft provided at an intermediate of the connecting link member restrains a relative movement of the sunshade panels in cooperation with the engagement shaft when the second and third sunshade panels are located within the same plane, and the supporting shaft, the engagement shaft and the shaft are arranged in parallel to one another and are aligned along one straight line in a sliding direction of the panels. Thus, by means of the three shaft parts, the relative movement of the sun shade panels adjacent to each other can be easily restricted and permitted.

According to the embodiments, the supporting shaft, the engagement shaft and the shaft of the connecting member are formed by bending the connecting link member into the shape of substantially letter S. Therefore, the connecting member can be structured easily at low cost.

The principles, preferred embodiment and mode of operation of the present invention have been described in the foregoing specification. However, the invention which is intended to be protected is not to be construed as limited to the particular embodiment disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A sunshade panel apparatus, comprising:
a first sunshade panel, a second sunshade panel and a third sunshade panel provided below a panel attached to a roof portion of a vehicle, the first sunshade panel located at the forefront in a forward and backward direction of the vehicle, the third sunshade panel located at the rearmost in the forward and backward direction and the second sunshade panel adjacently located between the first sunshade panel and the third sunshade panel;

first connecting member connecting the second sunshade panel and the third sunshade panel so that the second sunshade panel and the third sunshade panel are moved integrally or relatively in a manner that the second and third sunshade panels are moved between closing positions, in which the second and third sunshade panels are arranged adjacent to each other within the same plane, and opening positions, in which the second and third sunshade panels are arranged to overlap each other in parallel;

a guide rail supporting the first, second and third sunshade panels to be slidable within the same plane; and a panel housing portion for storing the first, second and third sunshade panels overlapping one another in parallel and provided with inclined guiding portions at both end portions in the forward and backward direction of the vehicle to move the first, second and third sunshade panels in parallel in an upward direction of the vehicle, wherein the first connecting member includes:
a supporting portion provided at one of the second and third sunshade panels and supported to be rotatable about a horizontal axis parallel to a width direction of the vehicle;
an engagement groove provided at the other one of the second and third sunshade panels;
an engagement portion slidably engaged with the engagement groove; and
a biasing member for applying a rotational moment about the supporting portion to the engagement portion.

2. A sunshade panel apparatus according to claim 1, wherein, the first connecting member is held in a posture parallel to the guide rail and restrains a relative movement of the second and third sunshade panels when the second and third sunshade panels are at the closing positions, in which the second and third sunshade panels are arranged adjacent to each other within the same plane, and the first connecting member is held in a posture tilted against the guide rail and allows the relative movement of the second and third sunshade panels when the second and third sunshade panels are at the opening positions, in which the second and third sunshade panels are arranged to overlap each other in parallel.

3. A sunshade panel apparatus according to claim 2, wherein the first connecting member further includes a connecting link member, the supporting portion is a supporting shaft provided at one end of the connecting link member and supported by the one of the second and third sunshade panels, the engagement portion is an engagement shaft provided at the other end of the connecting link member and slidably engaged with the engagement groove, the first connecting member further includes a shaft provided at an intermediate of the connecting link member restrains a relative movement of the sunshade panels in cooperation with the engagement shaft when the second and third sunshade panels are located within the same plane, and the supporting shaft, the engagement shaft and the shaft are arranged in parallel to one another and are aligned along one straight line in a sliding direction of the panels.

4. A sunshade panel apparatus according to claim 3, wherein the supporting shaft, the engagement shaft and the shaft of the connecting member are formed by bending the connecting link member into the shape of substantially letter S.

5. A sunshade panel apparatus according to claim 4, wherein the connecting link member is a round bar.

6. A sunshade panel apparatus according to claim 1, further comprising:
second connecting member connecting the first sunshade panel and the second sunshade panel so that the first sunshade panel and the second sunshade panel are moved integrally or relatively in a manner that the first and second sunshade panels are moved between closing position, in which the first and second sunshade panels are arranged adjacent to each other within the same plane, and opening positions, in which the first and second sunshade panels are arranged to overlap each other in parallel, the second connecting member includes:
a supporting portion provided at one of the first and second sunshade panels and supported to be rotatable about a horizontal axis parallel to a width direction of the vehicle;
an engagement groove provided at the other one of the first and second sunshade panels;
an engagement portion slidably engaged with the engagement groove; and
a biasing member for applying a rotational moment about the supporting portion to the engagement portion.

7. A sunshade panel apparatus, comprising:
a first sunshade panel and a second sunshade panel provided below a panel attached to a roof portion of a vehicle, the first sunshade panel located at the front in a forward and backward direction of the vehicle and the second sunshade panel located at the rear in the forward and backward direction;
connecting member connecting the first sunshade panel and the second sunshade panel so that the first sunshade panel and the second sunshade panel are moved integrally or relatively in a manner that the first and second sunshade panels are moved between closing position, in which the first and second sunshade panels are arranged adjacent to each other within the same plane, and opening positions, in which the first and second sunshade panels are arranged to overlap each other in parallel;
a guide rail supporting the first and second sunshade panels to be slidable within the same plane; and
a panel housing portion for storing the first and second sunshade panels overlapping one another in parallel and provided with inclined guiding portions at both end portions in the forward and backward direction of the vehicle to move the first and second sunshade panels in parallel in an upward direction of the vehicle,
wherein the connecting member includes:
a supporting portion provided at one of the first and second sunshade panels and supported to be rotatable about a horizontal axis parallel to a width direction of the vehicle;
an engagement groove provided at the other one of the first and second sunshade panels;
an engagement portion slidably engaged with the engagement groove; and
a biasing member for applying a rotational moment about the supporting portion to the engagement portion.

* * * * *